US010637044B2

(12) United States Patent
Fleming et al.

(10) Patent No.: US 10,637,044 B2
(45) Date of Patent: Apr. 28, 2020

(54) CORROSION RESISTANT POSITIVE GRID FOR LEAD-ACID BATTERIES (71) Applicants: NorthStar Battery Company, LLC, Springfield, MO (US); RSR Technologies Inc., Dallas, TX (US)

(72) Inventors: Frank A. Fleming, Springfield, MO (US); Timothy W. Ellis, Dallas, TX (US); David R. Prengaman, Dallas, TX (US)

(73) Assignees: NORTHSTAR BATTERY COMPANY, LLC, Springfield, MO (US); RSR TECHNOLOGIES INC., Dallas, TX (US)

( * ) Notice: Subject to any disclaimer, the term of this patent is extended or adjusted under 35 U.S.C. 154(b) by 0 days.

(21) Appl. No.: 15/968,509

(22) Filed: May 1, 2018

(65) Prior Publication Data

US 2018/0248171 A1 Aug. 30, 2018

Related U.S. Application Data (62) Division of application No. 14/533,325, filed on Nov. 5, 2014, now Pat. No. 9,985,276.

(Continued)

(51) Int. Cl.
*H01M 4/14* (2006.01)
*H01M 4/16* (2006.01)
(Continued)

(52) U.S. Cl.
CPC .............. *H01M 4/14* (2013.01); *H01M 4/22* (2013.01); *H01M 4/72* (2013.01); *H01M 4/73* (2013.01);
(Continued)

(58) Field of Classification Search
CPC .......... H01M 4/14; H01M 4/22; H01M 4/685; H01M 4/72; H01M 4/73; H01M 4/74;
(Continued)

(56) References Cited

U.S. PATENT DOCUMENTS 3,309,228 A 3/1967 Dodson et al.
4,456,579 A 6/1984 Rao et al.
(Continued)

FOREIGN PATENT DOCUMENTS

DE 2758940 7/1979
DE 3045683 A1 6/1982
(Continued)

OTHER PUBLICATIONS

Bouirden et al., "Discontinuous and Continuous Hardening Processes in Calcium and Calcium-Tin Micro-Alloyed Lead: Influence of 'Secondary-Lead' Impurities", Journal of Power Sources, 1991, pp. 27-50, vol. 33.

(Continued)

*Primary Examiner* — Brittany L Raymond
(74) *Attorney, Agent, or Firm* — Thompson Coburn LLP; Steven M. Ritchey (57) ABSTRACT A process of preparing a continuous cast lead-based alloy strip for use in the manufacture of a battery grid of a lead-acid battery, the process comprising mechanically deforming, at a deformation temperature in a range of about 15 to about 150° C., a continuous cast lead-based alloy strip having a thickness of $t_{cast}$ that is in a range that is from about 0.6 to about 2 mm to reduce the thickness of the strip to a thickness of $t_{reduced}$ that is in a range that is from about 0.4 to about 1.5 mm such that the reduction in thickness is in a range of about 10 to about 50%, wherein the lead-based alloy comprises lead and silver and is essentially free of (Continued)

calcium, and wherein the silver is at a concentration that is in a range of about 0.003 to about 0.015 weight percent.

16 Claims, 7 Drawing Sheets

Related U.S. Application Data (60) Provisional application No. 61/900,712, filed on Nov. 6, 2013.

(51) Int. Cl.
| | | |
|---|---|---|
| *H01M 4/22* | (2006.01) | |
| *H01M 4/72* | (2006.01) | |
| *H01M 4/74* | (2006.01) | |
| *H01M 4/73* | (2006.01) | |
| *H01M 4/02* | (2006.01) | |

(52) U.S. Cl.
CPC ........ *H01M 4/74* (2013.01); *H01M 2004/028* (2013.01); *Y10T 29/10* (2015.01)

(58) Field of Classification Search
CPC ... H01M 4/82; H01M 2004/028; Y10T 29/10; C22F 1/12; C22C 11/00; C22C 11/06
See application file for complete search history.

(56) References Cited

U.S. PATENT DOCUMENTS

| | | |
|---|---|---|
| 5,298,350 A | 3/1994 | Rao |
| 5,434,025 A | 7/1995 | Rao et al. |
| 5,691,087 A | 11/1997 | Rao et al. |
| 5,834,141 A | 11/1998 | Anderson et al. |
| 5,874,186 A | 2/1999 | Rao et al. |
| 2002/0088515 A1* | 7/2002 | Aust ................ C22C 11/00 148/706 |
| 2003/0017399 A1 | 1/2003 | Zhang et al. |
| 2004/0033157 A1 | 2/2004 | Schaeffer |
| 2004/0110067 A1 | 6/2004 | Taylor |
| 2006/0039852 A1* | 2/2006 | Trischan ............ C01G 21/00 423/619 |
| 2008/0233482 A1* | 9/2008 | Prengaman ........ C22C 11/06 429/245 |
| 2011/0111301 A1 | 5/2011 | Rossi et al. |

FOREIGN PATENT DOCUMENTS

| | | |
|---|---|---|
| EP | 0051897 A1 | 5/1982 |
| EP | 1349222 A2 | 10/2003 |
| JP | H09283137 A | 10/1997 |
| JP | 2003346811 A | 12/2003 |
| WO | 2008/115943 A1 | 9/2008 |

OTHER PUBLICATIONS

Fouache et al., "Effect of Calcium, Tin and Silver Contents in the Positive Grids of Automotive Batteries with Respect to the Grid Manufacturing Process", Journal of Power Sources, 1999, pp. 12-22, vol. 78.

Prengaman, "Challenges From Corrosion-Resistant Grid Alloys in Lead Acid Battery Manufacturing", Journal of Power Sources, 2001, pp. 224-233, vol. 95.

Prengaman, "Wrought Lead Calcium Tin Alloys for Tubular Lead-Acid Battery Grids", Journal of Power Sources, 1995, pp. 207-214, vol. 53.

\* cited by examiner

Figure 1

| Alloy | Cast→Quenched | Cast→Quenched→Heat Treatment | Cast→Quenched→Rolled (50% reduction) | Cast→Quenched→Rolled (50% reduction)→Heat Treatment |
|---|---|---|---|---|
| Primary Pb | | | | |
| Grain Boundaries* | 4 | 11 | 14 | 10 |
| Primary Pb + 50 ppm Ag | | | | |
| Grain Boundaries* | 1 | 10 | 15 | 18 |
| Primary Pb + 100 ppm Ag | | | | |
| Grain Boundaries* | 2 | 4 | 14 | 17 |

* Number of grain boundaries intersected by a 1 mm perpendicular line across the thickness of the strip

| Alloy | Cast→Quenched | Cast→Quenched→ Heat Treatment | Cast→Quenched→ Rolled (50% reduction) | Cast→Quenched→ Rolled (50% reduction)→ Heat Treatment |
|---|---|---|---|---|
| Secondary Pb (~50 ppm Ag) | 7 | 3 | 14 | 17 |
| Grain Boundaries* | | | | |
| Secondary Pb + 100 ppm Ag | 2 | 1 | 24 | 23 |
| Grain Boundaries* | | | | |

* Number of grain boundaries intersected by a 1 mm perpendicular line across the thickness of the strip

CORROSION RESISTANT POSITIVE GRID FOR LEAD-ACID BATTERIES

CROSS-REFERENCE TO RELATED APPLICATIONS

The present application is divisional application of U.S. Ser. No. 14/533,325, filed Nov. 5, 2014, which claims the benefit of U.S. Provisional Patent Application Ser. No. 61/900,712, filed Nov. 6, 2013, each of which is incorporated herein by reference in its entirety.

BACKGROUND OF THE INVENTION

1. Field of the Invention

The present application relates to lead-based alloy compositions that are subjected to mechanical deformation to produce a positive grid for lead-acid batteries that have enhanced corrosion resistance compared to otherwise identical compositions that are not subjected to such mechanical deformation. More specifically, the lead-based alloy comprises silver and is subjected to mechanical deformation to increase the number, amount, or density of grain boundaries, wherein the concentration of silver is sufficient to stabilize a significant portion of said grain boundaries such that the corrosion resistance of the alloy tends to be better than that of (a) a chemically identical alloy that is not mechanically deformed and (b) a mechanically deformed alloy that does not comprise silver in an amount sufficient to stabilize grain boundaries.

2. Description of Related Technology

Modern storage batteries require a relatively large number of grids, which requires that the grids be particularly thin. These high performance batteries allow for relatively high voltages, amperages, rapid discharge and recharge, or a combination thereof, which makes them particularly useful for automobile starting batteries, full electric and hybrid electric vehicles, and stationary batteries for uninterruptible power service or telecommunications service.

Lead-calcium-based alloys largely replaced lead-antimony-based alloys as the materials of choice for positive grids of both automobile and stationary lead-acid batteries for a variety of reasons. Lead-antimony alloys were replaced primarily because they tend to corrode more rapidly than lead-calcium alloys. This corrosion is detrimental because it tends to result in the release of antimony, which during a recharge process, tends to migrate to the negative plate where it causes a loss of water from the electrolyte, particularly when exposed to relatively hot environments. In contrast, lead-calcium alloys tend to be significantly resistant to water loss during service and, as a result, they are widely used to make grids for "maintenance-free" or sealed lead-acid (SLA) batteries.

Lead-calcium alloys have also been widely utilized because they typically have a very low freezing range and are capable of being processed into positive and negative grids by a variety of grid manufacturing processes, such as conventional book mold casting, rolling and expanding, continuous casting followed by expansion or punching, continuous grid casting, and continuous grid casting followed by rolling. Continuous grid manufacturing processes are particularly desirable because they typically decrease production costs associated with battery grid and plate production.

Production of thin grids whether conventional book mold cast, continuously cast, continuously cast strip followed by expansion or direct continuous cast followed by rolling, typically entails handling the grid or the strip at relatively high temperatures. The thinner the grid or strip, the more difficult it is to handle the grid or strip at such temperatures. Typical production processes rapidly decrease the temperature of the grid or strip with air cooling, water cooling, or water-cooled trim dies and platens depending on the process. The enhanced reduction in temperature has been used for lead-calcium alloy grids because they tend to be weak at elevated temperatures and a rapid reduction in temperature tends to counter deformations or thickness changes due to inadequate hardness. Despite rapid cooling to room temperature, many grid materials produced from low-calcium, lead-based alloys tend to be difficult to handle due to inadequate hardness even at room temperature.

In addition to hardness, the physical dimensions of grids/strips also affect the amount of handling/processing a grid/strip is able to acceptably withstand. In general, grids having a thickness of at least 0.060 inches (1.524 mm) typically have enough mass so that they are better able to withstand handling/processing despite having low mechanical properties. Thus, such "thick" grids typically may be cooled to room temperature more slowly than grids having a thickness that is less than 0.060 inches (1.524 mm) (i.e., "thin" grids). Also, thick grids typically withstand the handling associated with pasting more readily than thin grids.

Certain mechanical properties of lead-calcium grid alloys depend, not only on temperature, but also on aging. Specifically, after being reduced to room temperature, the hardness of such alloys tends to be greater after a period of time has lapsed than when it initially reached room temperature.

The early lead-calcium alloys typically contained a relatively high calcium content (e.g., 0.08% or higher) and relatively low tin content (e.g., 0.35-0.5%). Advantageously, positive grids produced from these alloys hardened rapidly and could be handled and pasted into plates easily. Specifically, these alloys, because of the high calcium contents, tend to form $Pb_3Ca$ precipitates over $Sn_3Ca$ precipitates. Additionally, although the $Pb_3Ca$ precipitates tend to harden the alloy, they tend to result in increased corrosion and growth of positive grids in high temperature applications (e.g., newer, more aerodynamic automobiles with less cooling of the battery by flowing air). To address this problem, lead-calcium alloys were developed that contain lower calcium concentrations and other metals added to the alloy (e.g., U.S. Pat. Nos. 5,298,350; 5,434,025; 5,691,087; 5,834,141; 5,874,186; as well as U.S. Pat. No. DE 2,758,940). The grids produced from these alloys, however, are not without problems. The very low calcium contents (0.02-0.05%) generally utilized in the grid alloys produce grids which are very soft, difficult to handle, and harden very slowly. To utilize grids produced from these alloys, the cast material is usually stored at room temperature for long periods of time or artificially aged at elevated temperatures to bring the material to sufficiently high mechanical properties to be handled in a pasting or expander/paster machine.

Low-calcium alloys typically also contain tin at a relatively low amount and silver at a relatively high amount and these alloys tend to be relatively corrosion-resistant. Nevertheless, in addition to the above-described handling issue, these alloys also usually require special procedures in order to be made into a battery plate. Specifically, a grid is typically pasted with a mixture of lead oxide, sulfuric acid, water, and some additives. After pasting, the plates are cured to permit the paste (active material of the battery) to firmly adhere to the battery grid so that there is sufficient electrical contact between the grid and the active material. Unfortunately, to cure the plates, the grids must be corroded so that the paste adheres to the grid, which requires manufacturers to resort to significant effort and cost to corrode the corrosion-resistant grids. Examples of such efforts include treating the grids for long periods of time in hot steam environments to produce a corrosion film on the grid surface; treating the surface of the grids with alkaline reagents, peroxides, or persulfates; and long curing times at high temperature and humidity for as long as five days. Despite these efforts, the most common failure mechanism of batteries using such alloys is the disengagement of active material from the positive grid, not positive grid corrosion.

Such low Ca-low Sn-high Ag lead-based alloys have yet another problem that is due principally to the relatively low tin content (e.g., 0.3-0.6%). Specifically, the low tin contents permit the formation of non-conductive oxide layers between the grid and active material when the battery becomes discharged. The electrical resistance of these oxide products may prevent adequate charge acceptance during recharge of the battery if it becomes discharged, thus resulting in premature failure.

In view of the foregoing, a need exists for lead-based alloys for use in the production of grids for lead-acid batteries, in general, and positive grids, in particular, and having one or more of the following characteristics, abilities, and/or uses: resistance to corrosion at relatively high temperatures such as those found in automobile engine compartments; capable of being used to produce thin grids; hardens relatively rapidly so that the grid may be utilized in the production of battery plates within a relatively short period of time after production; that may be used without excessively long aging periods or without resorting to artificial aging; certain pastes adhere to the grid surface without curing; resistance to formation of non-conductive oxide layers between the grid and active material when a battery containing the grid is discharged; a degree of creep resistance and mechanical properties that allow the battery grid to resist the effects of elevated temperatures; and a grain structure stability resulting in reduced corrosion and the improved retention of the mechanical properties and active material at elevated temperatures.

SUMMARY OF THE INVENTION

The present invention is directed to a battery grid comprising a continuous cast and mechanically deformed lead-based alloy that comprises lead and silver and is essentially free of calcium, wherein the silver is at a concentration that is in a range of about 0.003 to about 0.015 weight percent, and has a predominant equiaxed grain structure that comprises grain sizes that are in a range of about 0.1 to about 5 microns.

Additionally, the present invention is directed to lead-acid battery comprising a container and, within the container, at least one positive plate, at least one negative plate, and at least one separator separating each positive and negative plates, wherein the positive plate comprises a battery grid that comprises a continuous cast and mechanically deformed lead-based alloy that comprises lead and silver and is essentially free of calcium, wherein the silver is at a concentration that is in a range of about 0.003 to about 0.015 weight percent, and has a predominant equiaxed grain structure that comprises grain sizes that are in a range of about 0.1 to about 5 microns.

The present invention is also directed to a process of preparing a continuous cast lead-based alloy strip for use in the manufacture of a battery grid of a lead-acid battery, the process comprising mechanically deforming, at a deformation temperature in a range of about 15 to about 150° C., a continuous cast lead-based alloy strip having a thickness of $t_{cast}$ that is in a range that is from about 0.6 to about 2 mm to reduce the thickness of the strip to a thickness of $t_{reduced}$ that is in a range that is from about 0.4 to about 1.5 mm such that the reduction in thickness is in a range of about 10 to about 50%, wherein the lead-based alloy comprises lead and silver and is essentially free of calcium, and wherein the silver is at a concentration that is in a range of about 0.003 to about 0.015 weight percent.

DETAILED DESCRIPTION OF THE INVENTION

The present invention, among other things, is directed to a battery grid that is particularly useful as a positive grid, wherein at least a portion of and preferably the entirety of said grid comprises a lead-based alloy that comprises lead and silver and is essentially free of calcium, wherein the silver is at a concentration that is at least about 0.003 weight percent, and has a predominant equiaxed grain structure that comprises grain sizes that are in a range of about 0.1 to about 5 microns or about 0.3 to about 3 microns, depending upon how much the alloy is worked/rolled. The term "equiaxed," as used herein with respect to the lead-based alloys of the present invention, is intended to mean, with respect to the crystals, crystal grains, and/or grain structure of these alloys, a lack of directionality of the crystals or crystal grains and an equal or substantially equal (e.g., within about 50% or 30%) length of the crystals or crystal grains along the axes of the crystals or crystal grains. Additionally, the phrase "predominantly equiaxed," as used herein with respect to the lead-based alloys of the present invention, is intended to mean in certain embodiments that at least 50%, 55%, 60%, 65%, 70%, 75%, 80%, 85%, 90%, 95%, 97.5%, 99%, 99.5%, or 100% by weight of the lead-based alloy is equiaxed.

Without being held to a particular theory, it is believed that the predominant equiaxed grain structure of the alloys of the present invention impart at least improved resistance to penetrating corrosion. Further, it is believed that the predominant equiaxed grain structure is a synergistic result achieved by controlling the concentrations of one or more elements in the lead-based alloy and the mechanical deformation of the alloy after being cast.

In certain embodiments, the lead-based alloy further comprises bismuth. In other embodiments, the lead-based alloy further comprises tin. In still other embodiments, the lead-based alloy further comprises bismuth and tin. In these embodiments, the bismuth and/or tin are at concentration(s) at least sufficient for the metals to play a role in the performance of the alloy as a grid alloy, in general, and as a positive grid alloy, in particular, and/or crystallographic structure of the alloy. Stated another way, the amounts of silver and/or bismuth in the lead-based alloy are such that the metals would not be considered an impurity or a trace amount.

Regarding the aforementioned alloy elements and their effect on forming the above-described predominant equiaxed grain structure, it is believed that the presence of silver provides the greatest desirable effect and bismuth, if present, provides a lesser desirable effect. As will be disclosed below, the presence of tin is believed to be counter-productive to achieving the desired predominant equiaxed grain structure but it is believed to impart other desirable properties such that including tin is often beneficial to the performance of the alloy as a whole.

As indicated, the mechanical deformation also contributes to the alloy being predominantly equiaxed. In particular, the mechanical deformation process comprises reducing the thickness of a continuous cast lead-based alloy strip. The mechanical deformation may be accomplished using any appropriate technique and equipment. Exemplary techniques include forging and rolling. Additionally, the mechanical deformation may be performed at temperatures appropriate for the technique and equipment. In one embodiment, the deformation temperature is about that of the process equilibrium temperature, which is up to about 150° C. In another embodiment, the deformation temperature(s) is/are in a range of about 15 to about 150° C. In another embodiment, the deformation temperature range is from about 75 to 125° C. A continuous cast lead-based alloy strip has a thickness, $t_{cast}$, that is typically in a range of about 0.6 to about 3 mm and the thickness is typically reduced to a thickness, $t_{reduced}$, that is in a range of about 0.4 to about 1.5 mm, which corresponds to a percentage of reduction (as determined according to the equation Redn %=$(t_{cast}-t_{reduced})/t_{cast}$) that is typically in a range from about 10 to about 50%. In another embodiment, the $t_{cast}$ range is from about 1 to about 2 mm, the $t_{reduced}$ range is from about 0.7 to about 1.5 mm, and the Redn % range is from about 25 to about 40%. Without being bound to a particular theory, it is believed that the following equation quantifies the average grain size as a function of alloy composition, the degree of mechanical deformation, and the temperature at which mechanical deformation occurs.

Avg. Grain Size (μm)=(0.026×Ag %)+(0.099×Bi %)+(1.922×Sn %)+(0.273×Redn %)+(0.013× Temp (° C.)).

The grids of the present invention are particularly useful for producing lead-acid batteries. Such a battery comprises, among other things, a container and, within the container, at least one positive plate, at least one negative plate, and at least one separator separating each positive and negative plate, wherein the positive plate comprises a battery grid having a surface and an active material adhered to at least a portion of the battery grid surface, wherein the battery grid comprises the aforementioned lead-based alloy. Such batteries may be configured for essentially any end application such as starting-lighting and ignition (automobile) batteries, full electric and hybrid electric vehicles, and stationary batteries for uninterruptible power service or telecommunications service. The separator(s) may be, for example, absorbed glass mat (AGM), granular silica, high silica glass, or polymeric.

In particular, it has been discovered that alloy compositions of the present invention have one or more of the following characteristics, abilities, and/or uses: capable of forming thin grids having a thickness no greater than about 0.060 inches (no greater than about 1.5 mm); harden relatively rapidly so that the grid may be utilized in the production of battery plates within a relatively short period of time after being produced; capable of being used without excessively long aging periods or without resorting to artificial aging; certain pastes adhere to its surface (formed as a grid) without curing; resistant to the formation of non-conductive oxide layers between the grid and active material when a battery containing the grid is discharged; are resistant to corrosion, when in a battery, at relatively high temperatures such as those found in automobile engine compartments; have a degree of creep resistance and mechanical properties that allow the battery grid to resist the effects of elevated temperatures; and/or have a grain structure stability resulting in reduced corrosion and the improved retention of the mechanical properties and active material at elevated temperatures.

It is to be noted that all references to constituent percentages herein are to weight percentages. The amounts may also be disclosed in parts per million. Additionally, the alloy compositions of the present invention are the overall stoichiometries or bulk stoichiometries prior to being used in a battery. That is, a disclosed alloy composition is an average stoichiometry over the entire volume of a prepared alloy and, therefore, localized stoichiometric variations may exist.

Lead

The alloy of the present invention is lead-based and, therefore, its primary constituent is lead. Specifically, the alloy compositions of the present invention comprise at least about 95% lead. Typically, the alloys comprise at least about 98% lead.

Silver

As indicated above, the lead-based alloy comprises silver at a concentration that is at least about 0.003% (30 ppm). In some embodiments, the concentration of silver is at least about 0.004% (40 ppm). Without being held to a particular theory, it is believed that the presence of silver in the lead-based alloys at concentrations of at least about 0.003% (30 ppm) or 0.004% (40 ppm) tends to result in silver-containing compounds at grain boundaries, especially in the presence of tin, wherein said silver-containing compounds tend to "pin," or stabilize crystallographic grains in the lead-based alloy, and at dendritic regions. In addition, the presence of silver is believed to strengthen the lead matrix, which is also often referred to as solid solution strengthening, and is believed to provide enhanced creep resistance to the alloys of the present invention, which among other things, allows for active material to adhere better to the surface of a grid during cycling.

There typically is a maximum amount of silver due to a variety of concerns. The first is the relatively high cost of silver. Second, as the concentration of silver is increased and if tin is present, there is a tendency to form a relatively low melting point Pb—Ag—Sn ternary eutectic material that makes casting difficult and can even cause cracking of a continuously cast strip. Third, too much silver can make the grid too resistant to corrosion thereby necessitating extraordinary measures to cause the corrosion needed to "cure" or bond to a positive grid certain active material pastes. Thus, although it may be possible for the alloys of the present invention to contain relatively high amounts of silver (e.g., up to 1.200%), this is typically not necessary and usually not preferred in view of the foregoing concerns. Specifically, in certain embodiments the concentration of silver in the alloys of the present invention is typically no greater than about 0.015% (150 ppm). In other embodiments, the concentration of silver is no greater than about 0.011% (110 ppm).

In view of the foregoing minimum and maximum silver concentration embodiments, a further embodiment is for the silver to be at a concentration that is in a range from about 0.003% (30 ppm) to about 0.015% (150 ppm). In another embodiment, the silver concentration range is from about 0.003% (30 ppm) to about 0.011% (110 ppm). In yet another embodiment, the silver concentration range is from about 0.004% (40 ppm) to about 0.011% (110 ppm). In still another embodiment, the silver concentration range is from about 0.004% (40 ppm) to about 0.015% (150 ppm).

Calcium

In order to avoid the above-described problems or complications that are associated with the presence of calcium in battery grid alloy, the lead-based alloy compositions of the present invention contain at most an inconsequential amount of calcium (i.e., not enough calcium to form $Pb_3Ca$ precipitates and $Sn_3Ca$ precipitates because both types of precipitates tend to increase the rate of corrosion). See, e.g., D. Prengaman, Wrought Lead Calcium Tin Alloys for Tubular Lead-acid Battery Grids, Journal of Power Sources, Vol. 53, 1995, pp 207-214, including Tables 2 and 3, which show the corrosion rate increases as the calcium concentration increases. For example, the concentration of calcium is typically less than about 0.010% (100 ppm) and preferably less than about 0.005% (50 ppm). More preferably, the alloys of the present invention are essentially free of calcium such that they contain no more calcium than what is considered to be an impurity level, which is about 0.001% (10 ppm).

Bismuth

As indicated above, bismuth may be present in the lead-based alloy at a concentration greater than what would be considered to be an impurity or a trace amount. Without being bound to a particular theory, it is believed that bismuth atoms tend to replace lead atoms in the crystallographic structure thereby creating space in the structure to better accommodate silver atoms. More specifically, because bismuth tends to be quite soluble in lead and relatively non-reactive with tin and silver, which allows for the bismuth to largely remain in the solid solution, and because bismuth atoms are somewhat larger than lead atoms, the lattice is slightly stretched. It is believed that the stretching of the lattice provides a small but significant increase of the strength of the lead-based alloy. Additionally, it is believed that bismuth also aids in the casting and handling of the alloy by helping it "age" more quickly (i.e., it tends to increase the strengthening rate of the alloy after being cast for improved handling and processing).

In one such embodiment, the bismuth is at a concentration that is at least about 0.003% (30 ppm). In another embodiment, the bismuth concentration is at least about 0.005% (50 ppm). In yet another embodiment, the bismuth concentration is no greater than about 0.02% (200 ppm). In still another embodiment, the concentration of bismuth is no greater than about 0.015% (150 ppm). In view of the foregoing minimum and maximum bismuth concentration embodiments, a further embodiment is for the bismuth to be at a concentration that is in a range from about 0.003% (30 ppm) to about 0.020% (200 ppm). In another embodiment, the bismuth concentration range is from about 0.003% (30 ppm) to about 0.015% (150 ppm). In yet another embodiment, the bismuth concentration range is from about 0.005% (50 ppm) to about 0.02% (200 ppm). In still another embodiment, the bismuth concentration range is from about 0.005% (50 ppm) to about 0.015% (150 ppm).

Tin

As indicated above, tin may be present in the lead-based alloy at a concentration greater than what would be considered to be an impurity or a trace amount. Without being bound to a particular theory, it is believed that desirable hardening characteristics such as increased hardening rate and yield strength are imparted to the alloy by the addition of tin.

Additionally, it is believed that including tin in the lead-based alloy provides desirable electrical characteristics. For example, it is believed that the presence of tin in the lead-based alloy tends to reduce the rate of corrosion that forms a corrosion product layer between the grid alloy and the active material when the battery is charged. This, in turn, is believed to result in the corrosion product layer being thinner, which aids in recharge. Further, it is believed that the presence of tin, in the form of $SnO_2$, in the corrosion product layer tends to decrease the relative amount of insulating layer thereby resulting in reduced passivation. It is also believed that some of the tin near the surface of the alloy migrates to and dopes positive active material, which allows for a more complete recovery from deep discharge. Specifically, it is believed that the addition of the tin helps to reduce the production of $PbSO_4$ or tetragonal PbO at the grid/active material interface when deeply discharged. These products can act as insulators that inhibit recharge except at very high potentials, which are not typically produced by automobile alternators.

It is important to note that, unlike in Pb—Ca alloys, the presence of tin in the alloys of the present invention is not believed to enhance resistance to penetrating corrosion of the grid. Specifically, it is known that adding tin to high-Ca alloys (e.g., 0.06-0.08% Ca) such that the tin concentration is about 1% results in high-Ca alloys having similar or lower corrosion rates in acid media than low-Ca alloys. See, e.g., Prengaman, The Metallurgy and Performance of Cast and Rolled Lead Alloys for Battery Grids, Journal of Power Sources, 67 (1997) 267-278. For low-Ca or essentially Ca-free alloys such as those of the present invention, however, it is believed that tin modifies the interfacial barrier and increases grain sizes, which tend to make the alloy more prone to penetrating corrosion along the grain boundaries, which corrode preferentially, especially when exposed to high service temperatures. Despite the tin's tendency to increase penetrating corrosion, the reduction of which is a goal of the present invention, and its relatively high cost, it is believed that the benefits provided by tin are often justified for batteries that are likely to be subjected to deep discharge during service.

In one such embodiment, the tin concentration is at least about 0.2% (1,000 ppm). In another embodiment, the tin concentration is at least about 0.4% (4,000 ppm). In another embodiment, the tin concentration is at least about 0.5% (5,000 ppm). In yet another embodiment, the tin concentration is no greater than about 1.8% (18,000 ppm). In still another embodiment, the tin concentration is no greater than about 1.5% (15,000 ppm). In another embodiment, the tin concentration is no greater than about 1% (10,000 ppm). In view of the foregoing possible minimum and maximum tin concentration embodiments, a further embodiment is for the tin to be at a concentration that is in a range from about 0.2% (2,000 ppm) to about 1.8% (18,000 ppm). At a concentration greater than about 1.8%, tin tends to precipitate and change the grain structure of the alloy. In another embodiment, the tin concentration range is from about 0.4% (4,000 ppm) to about 1.5% (15,000 ppm). In yet another embodiment, the tin concentration range is from about 0.5% (5,000 ppm) to about 1 (10,000 ppm).

Additional Alloy Constituents

In some embodiments of the present invention, the lead-based alloy composition comprises further elements at concentrations above the impurity or trace level. For example, cadmium and/or zinc may be included because these elements have a tendency to reduce gassing. Aluminum may be included because it has a tendency to decrease potential oxidation of the cast strip. Additionally, barium may be included because it is believed that it may decrease penetrating corrosion. These elements, if present, are typically at low concentrations (e.g., less than 30-40 ppm) because they tend to precipitate, which affects the grain structure.

In other embodiments, the lead-based alloys of the present invention consist essentially of the above-described elements at the disclosed concentrations. Thus, for example, in one embodiment the alloy consists essentially of lead and silver. In another embodiment, the alloy consists essentially of lead, silver, and bismuth. In still another embodiment, the alloy consists essentially of lead, silver, and tin. In yet another embodiment, the alloy consists essentially of lead, silver, bismuth, and tin. More specifically, the results to date suggest that battery grids, in particular those used as a positive grid, that contain lead and silver and optionally bismuth and/or tin and no more than 0.01% (100 ppm) of all other elements combined are readily formed and incorporated into essentially any lead-acid battery design and allow such batteries to operate more effectively or longer when subjected to extreme service conditions. In some embodiments, the concentration of all other elements combined may be no more than 0.003% (30 ppm) or 0.002% (20 ppm). In addition to the foregoing totals of all other elements, it is typically preferred that each other element be no greater than what is considered to be a "trace amount," which is typically considered to be an amount no greater than about 0.001% (10 ppm). Examples of typical trace elements include antimony, arsenic, cadmium, iron, nickel, selenium, tellurium, and zinc.

EXAMPLES

Strip Preparation Procedure

The metal/alloys were prepared by adding the necessary constituents to the melt pot. The molten alloy in the pot were chill cast into strips to a target thickness of 1.8 mm and quenched in water immediately after being cast. The cast alloy compositions were confirmed using inductively coupled plasma mass spectrometry or spark atomic emission spectroscopy. Strip samples for rolling were cut to an approximate length of 15 cm. The sample strips were either rolled at ambient temperature, approximately 25° C., or heated to a particular temperature in an oven for 18-24 hours before being rolled. The sample strips were hand-rolled using a jeweler's rolling mill which set to the required rolled thickness using a calibrated micrometer. As rolled thickness of 0.85 mm corresponds to about a 50% reduction in thickness. The samples that were subjected to a post-rolling heat treatment were placed in an oven at a temperature of about 65° C. for 48-72 hours.

Sample Preparation—Reagents and Equipment

The following were used in the preparation of the samples:
- Pollack's Etching Reagent: 10 gram ammonium molybdate, 10 gram citric acid, and 100 mL DI water;
- 4:3:1 etchant—4 parts of glycerol, 3 parts of glacial acetic acid and 1 part of 30% hydrogen peroxide;
- 10% nitric acid (technical grade) and 20% nitric acid (technical grade);
- 50% isopropyl alcohol; and
- colloidal silica polishing suspension, epoxy resin and hardener, paper cups, stirring stick, timer, scale, vacuum system, polishing cloths, candle wax, metal cutter, alumina powder, tincture green soap, blender, grinder-polisher, tincture green soap, vibratory polisher, and sample mounting cup and specimen support clips.

To prepare a sample, a piece/sample approximately 1.5 in (38 mm) long and 0.5 in (13 mm) wide was cut from a strip. The sample was mounted between two loops of plastic specimen support clips. A release agent was coated on the bottom and inside of cylinder wall of a mounting cup to ensure easy removal of the mount from the mold. The sample was placed at the center of the mounting cup with the surface of interest facing down. The sample (in the cup) was encapsulated in epoxy, approximately 7 parts by weight resin to 1 part by weight hardener. After the epoxy was cured, it was subject to the grinding and polishing procedure set forth in Table 1.

TABLE 1

| Step | Surface | Abrasive Size | Load per specimen (kg) | Base Speed (rpm) | *Relative Rotation | Time (min) |
|---|---|---|---|---|---|---|
| 1 | SiC abrasive disc | 320 grit, water cooled **wax coated | 1.36 | 100 | >> | Until Plane |
| 2 | SiC | 400 grit, | 1.36 | 100 | >> | 1 |

TABLE 1-continued

| Step | Surface | Abrasive Size | Load per specimen (kg) | Base Speed (rpm) | *Relative Rotation | Time (min) |
|---|---|---|---|---|---|---|
| | abrasive disc | water cooled **wax coated | | | | |
| 3 | SiC abrasive disc | 600 grit, water cooled **wax coated | 1.36 | 100 | ≫ | 1 |
| 4 | SiC abrasive disc | 800 grit, water cooled **wax coated | 1.36 | 100 | ≫ | 1 |
| 5 | white felt | ***5 μm alumina suspension | 1.82 | 100 | ≍ | 10-15 |
| 6 | micro cloth | ***1 μm alumina suspension | 1.36 | 100 | ≫ | 5 |
| 7 | microfloc | ***0.05 μm alumina suspension | 1.36 | 100 | ≫ | 5 |

*≫ = ↻ = complimentary (platen and specimen holder rotate in the same direction); and
≍ = ↻ = contra (platen and specimen holder rotate in opposite directions).
**Rub candle wax lightly across rotating disc prior to grinding.
***This product is powdered and the mixing instruction is as follows: For 5 μm Alumina powder, mix 30 grams of powder with 100 ml of DI/distilled water or mix 30 grams of powder, 10 mL of tincture green soap and 200 mL of DI/distilled water. For 1 μm powder, mix 40 grams of powder with 100 mL of distilled water or 40 grams of powder, 20 mL of tincture green soap and 400 mL of DI/distilled water. For 0.05 μm alumina powder, the mixing ratio was 2:1:20 (2 parts of alumina, 1 part of tincture green soap and 20 parts of DI water).

The samples were then subjected to final polishing using colloidal silica polishing suspension on a vibratory polisher for 30-60 minutes. After polishing, the specimens were etched for 4 minutes with either Pollack's reagent, 3:1 (Acetic Acid:Hydrogen peroxide), or 10% or 20% nitric acid. These etchants were alternated as needed until the grain boundaries are clear and visible with the microscope.

Pb—Ag Alloys Made with Primary Pb

Figure 1:
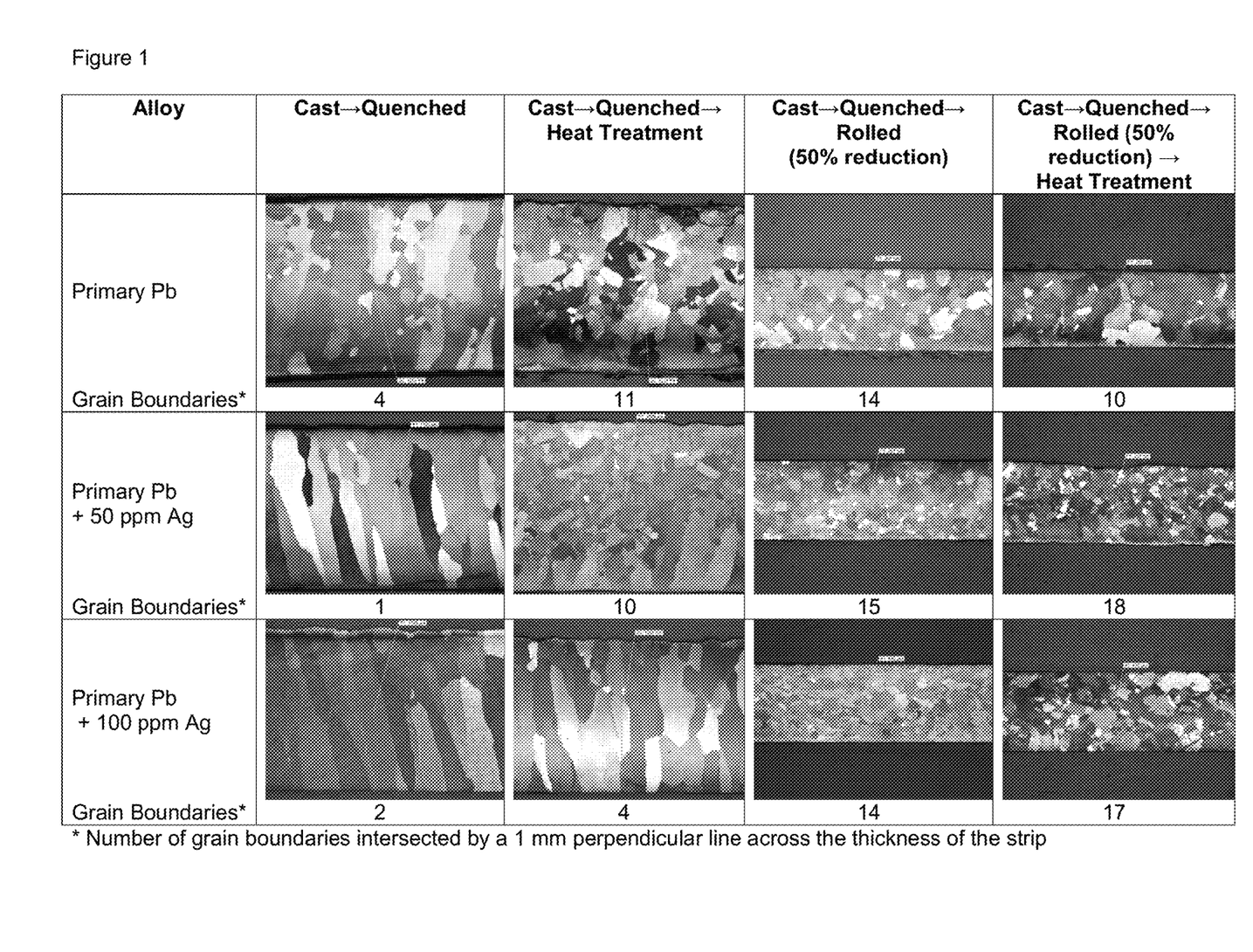
FIG. 1 contains photographic images of the crystallographic structures of the indicated compositions after being subjected to the indicated processes and indicates the number of grain boundaries intersected by a 1 mm line perpendicular to the length of the samples.
Figure 2:
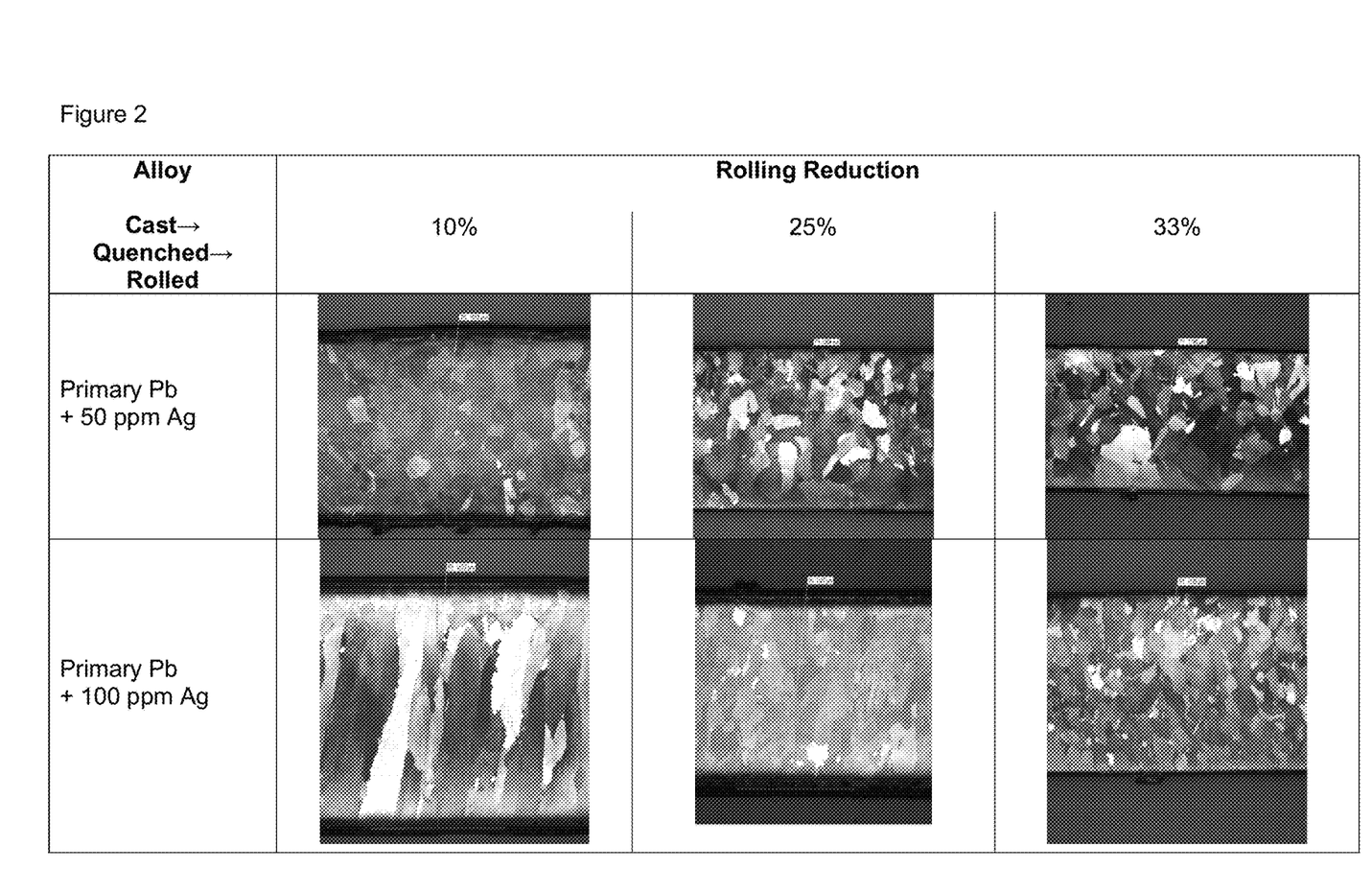
FIG. 2 contains photographic images of the crystallographic structures of the indicated compositions after being subjected to the indicated processes.

Three types of metal/alloy strips were made for this experiment—Primary Pb, Primary Pb+50 ppm Ag, and Primary Pb+100 ppm Ag. The results of a compositional analysis of the foregoing alloys are set forth in Table 2. Images of the strips showing the grain boundaries and the number of grain boundaries intersected by the indicated 1 mm line are set forth in FIG. 1. Additional images of strips showing the grain boundaries as a function composition and rolling reduction are set forth in FIG. 2.

TABLE 2

| Element | Primary Pb + ~50 ppm Ag* (ppm) | | Primary Pb + ~100 ppm Ag* (ppm) | |
|---|---|---|---|---|
| Ag | 57 | 59 | 103 | 104 |
| Al | 2 | 2 | 1 | 2 |
| As | 1 | 1 | 1 | <1 |
| Bi | 0 | 0 | 0 | 0 |
| Cd | <1 | <1 | <1 | <1 |
| Cr | 2 | 1 | 1 | 1 |
| Cu | 1 | 1 | 1 | 1 |
| Fe | Int. | 2 | 1 | Int. |
| Mn | 1 | <1 | 1 | <1 |
| Ni | <1 | <1 | <1 | <1 |
| Pt | 1 | 1 | 2 | 2 |
| Sb | 0 | 0 | 0 | 0 |
| Se | 0 | 0 | 0 | 0 |
| Sn | 1 | <1 | <1 | 1 |

TABLE 2-continued

| Element | Primary Pb + ~50 ppm Ag* (ppm) | | Primary Pb + ~100 ppm Ag* (ppm) | |
|---|---|---|---|---|
| Te | 0 | 0 | 0 | 0 |
| Zn | 1 | <1 | 1 | 1 |

*Each sample was tested twice using ICP Spectrometry.

An accounting of the number of grain boundary intersections as a function of alloy composition, rolling temperature, and amount of rolling reduction is set forth in Table 3.

TABLE 3

| Metal/Alloy Cast→Quenched→Rolled | Rolling Temp (° C.) | # of Grain Boundary Intersections* Rolling Reducton | | | | |
|---|---|---|---|---|---|---|
| | | 0% | 10% | 25% | 33% | 50% |
| Primary Pb | 25 | 4 | — | — | — | 14 |
| Primary Pb + 50 ppm Ag | 25 | 2 | 8 | 10 | 10 | 15 |
| | 100 | 2 | 8 | 13 | 14 | 19 |
| Primary Pb + 100 ppm Ag | 25 | 3 | 4 | 8 | 16 | 25 |
| | 100 | 3 | 6 | 10 | 20 | 25 |

*Number of grain boundaries intersected by a 1 mm perpendicular line across the thickness of the strip.

An accounting of the average grain size as a function of alloy composition, rolling temperature, and amount of rolling reduction is set forth in Table 4.

TABLE 4

| Metal/Alloy Cast→Quenched→Rolled | Rolling Temp (° C.) | Average Grain Size (mm²) Rolling Reducton | | | | |
|---|---|---|---|---|---|---|
| | | 0% | 10% | 25% | 33% | 50% |
| Primary Pb | 25 | 2.2 | — | — | — | 1.0 |
| | 100 | 3.5 | — | — | — | 1.6 |
| | 150 | — | — | — | — | — |
| Primary Pb + 50 ppm Ag | 25 | 13.0 | 4.8 | 3.6 | 2.6 | 0.8 |
| | 100 | 1.4 | — | — | — | 0.6 |
| | 150 | — | — | — | — | — |
| Primary Pb + 100 ppm Ag | 25 | 13.6 | — | 2.0 | 1.5 | 0.4 |
| | 100 | 6.8 | — | — | — | 0.6 |
| | 150 | — | — | — | — | — |

Pb—Ag—Bi Alloys Made with Primary Pb

Two types of metal/alloy strips were made for this experiment—Primary Pb+50 ppm Ag+70 ppm Bi, and Primary Pb+100 ppm Ag+70 ppm Bi. An accounting of the average grain size as a function of alloy composition, rolling temperature, and amount of rolling reduction is set forth in Table 5.

TABLE 5

| Metal/Alloy Cast→Quenched→Rolled | Rolling Temp (° C.) | Average Grain Size (mm²) Rolling Reducton | | | | |
|---|---|---|---|---|---|---|
| | | 0% | 10% | 25% | 33% | 50% |
| Primary Pb + 50 ppm Ag + 70 ppm Bi | 25 | 1.1 | 0.8 | 0.8 | 1.1 | 0.6 |
| | 100 | — | — | — | — | — |
| | 150 | 2.2 | 1.5 | 0.8 | 0.5 | 0.9 |
| Primary Pb + 100 ppm Ag + 70 ppm Bi | 25 | 4.2 | 1.5 | 1.0 | 0.8 | 0.6 |
| | 100 | — | — | — | — | — |
| | 150 | 15.8 | 0.8 | 0.7 | 0.9 | 0.4 |

Pb—Ag—Bi—Sn Alloys Made with Primary Pb

An accounting of the average grain size of a Pb—Ag—Bi—Sn alloy composition, as a function of rolling temperature and the amount of rolling reduction is set forth in Table 6.

TABLE 6

| Metal/Alloy | Rolling Temp | Average Grain Size (mm$^2$) Rolling Reducton | | | | |
|---|---|---|---|---|---|---|
| Cast→Quenched→Rolled | (° C.) | 0% | 10% | 25% | 33% | 50% |
| Primary Pb + | 25 | 13.0 | 1.1 | 1.1 | 1.3 | 1.0 |
| 50 ppm Ag + | 100 | — | — | — | — | — |
| 70 ppm Bi + | 150 | 7.1 | 1.8 | 1.4 | 0.8 | 1.0 |
| 100 ppm Sn | | | | | | |

Pb—Ag Alloys Made with Secondary Pb

Figure 3:
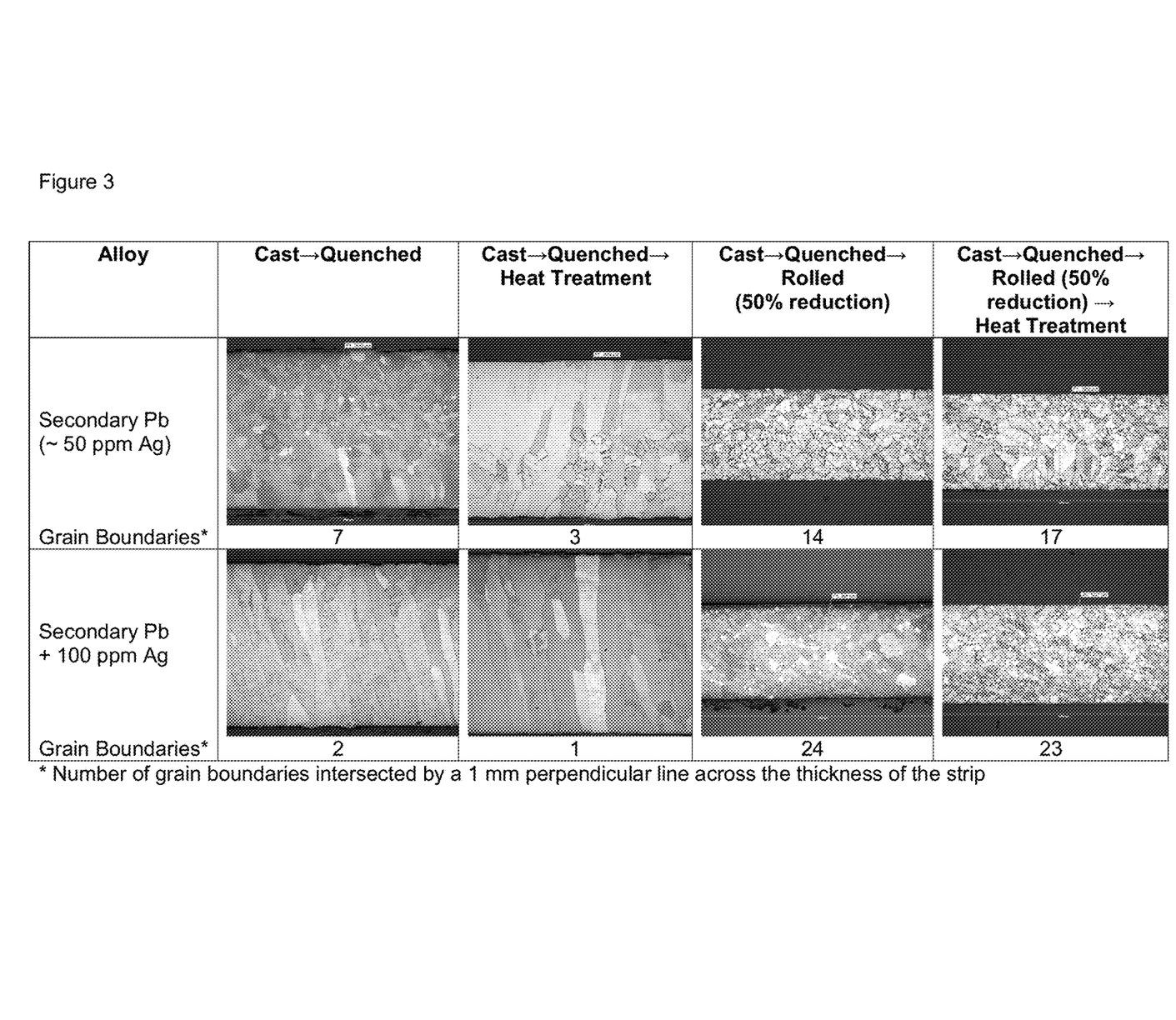
FIG. 3 contains photographic images of the crystallographic structures of the indicated compositions after being subjected to the indicated processes and indicates the number of grain boundaries intersected by a 1 mm line perpendicular to the length of the samples.
Figure 4:
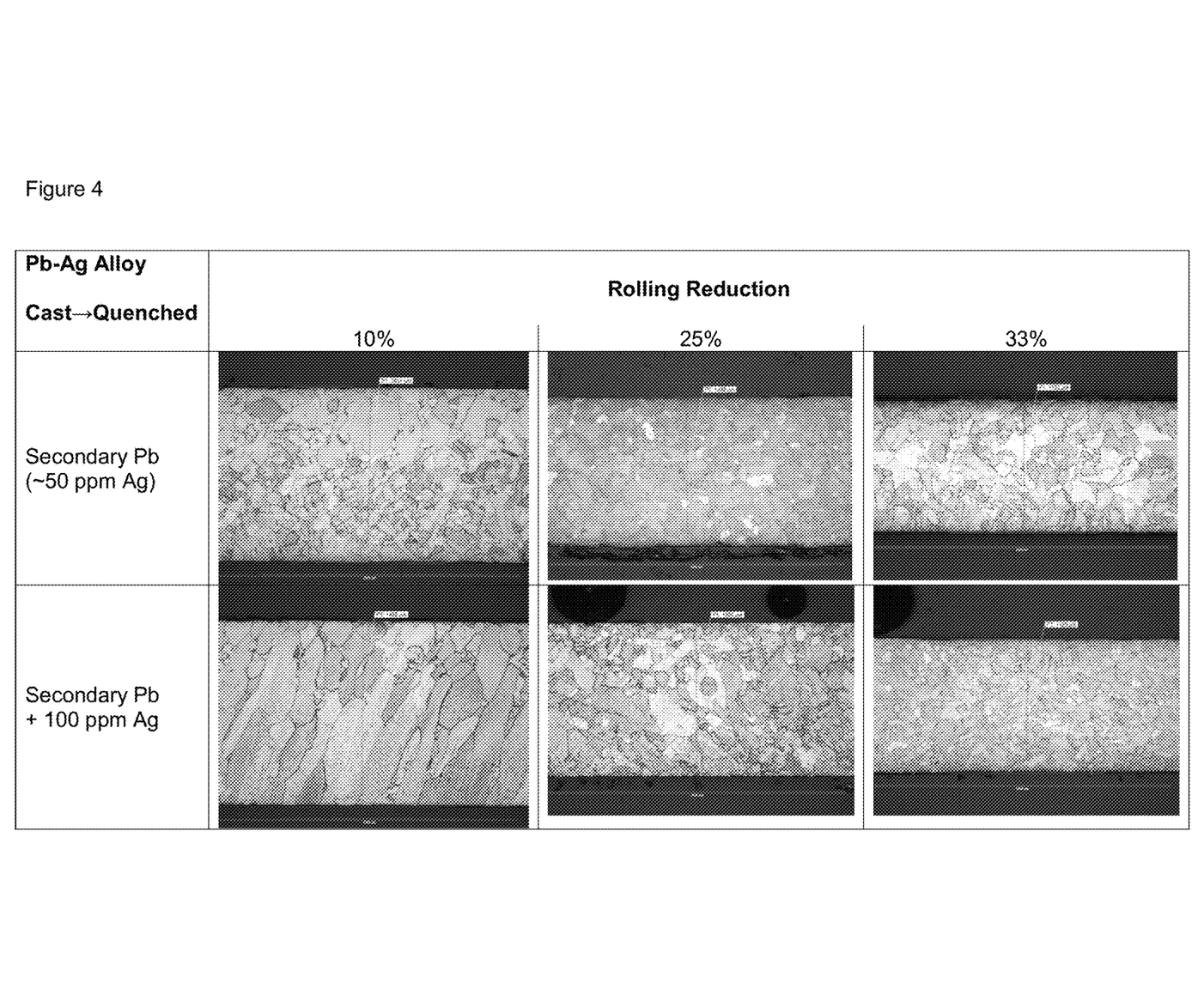
FIG. 4 contains photographic images of the crystallographic structures of the indicated compositions after being subjected to the indicated processes.
Figure 5:
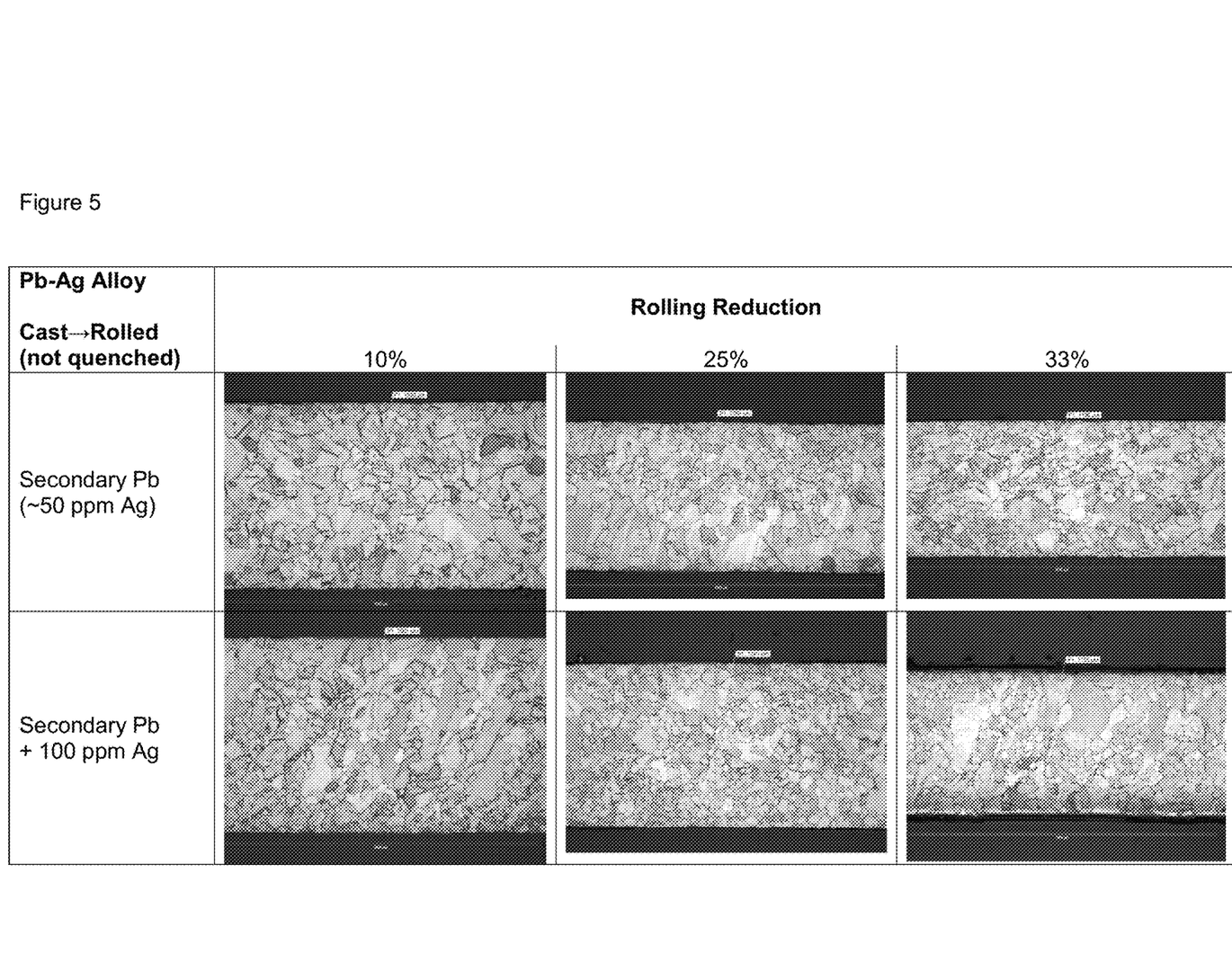
FIG. 5 contains photographic images of the crystallographic structures of the indicated compositions after being subjected to the indicated processes.

Two types of Pb—Ag alloy strips were made for this experiment—Secondary Pb, which contains about 50 ppm Ag (45 ppm measured; as set forth in Table 7), and Secondary Pb+added Ag to a total of 100 ppm Ag. Images of the strips showing the grain boundaries and the number of grain boundaries intersected by the indicated 1 mm line are set forth in FIG. 3. Additional images of strips showing the grain boundaries of the Pb—Ag alloys made with Secondary Pb that were Cast→Quenched→Rolled as a function of composition and rolling reduction are set forth in FIG. 4. Additional images of strips showing the grain boundaries of the Pb—Ag alloys made with Secondary Pb that were Cast→Rolled (not quenched) as a function of composition and rolling reduction are set forth in FIG. 5.

TABLE 7

| Element | Secondary Pb (wt %)* |
|---|---|
| Ag | 0.0045 |
| Al | 0.0001 |
| Bi | 0.0071 |
| Ca | 0.0000 |
| Cu | 0.0004 |
| Fe | 0.0003 |
| Mn | 0.0000 |
| Ni | 0.0001 |
| Sb | 0.0003 |
| Se | 0.0001 |
| Sn | 0.0000 |
| Te | 0.0001 |
| Zn | 0.0000 |

*by spark atomic emission spectroscopy

Pb—Ag—Sn Alloy Made with Secondary Pb

Figure 6:
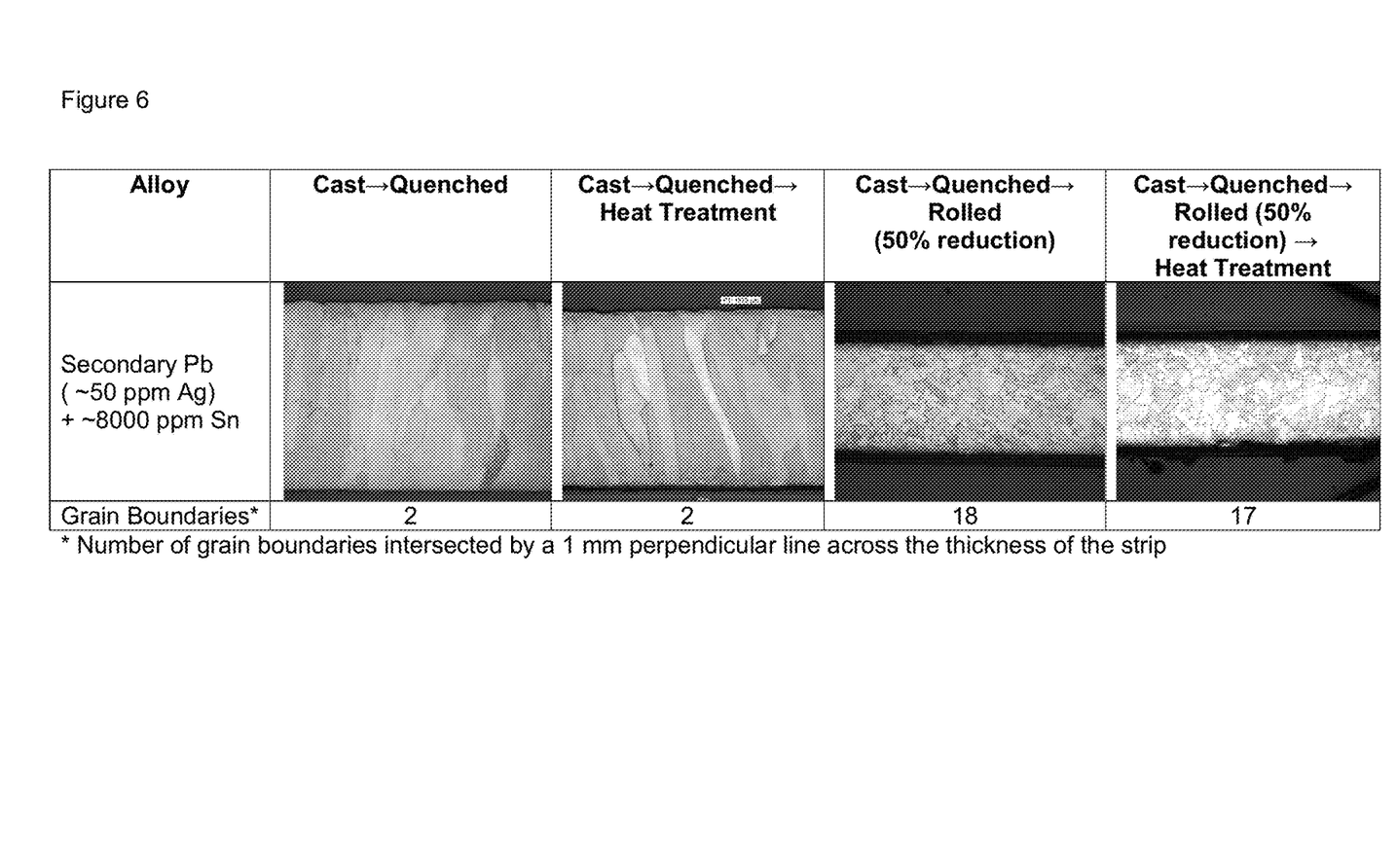
FIG. 6 contains photographic images of the crystallographic structures of the indicated compositions after being subjected to the indicated processes and indicates the number of grain boundaries intersected by a 1 mm line perpendicular to the length of the samples.
Figure 7:
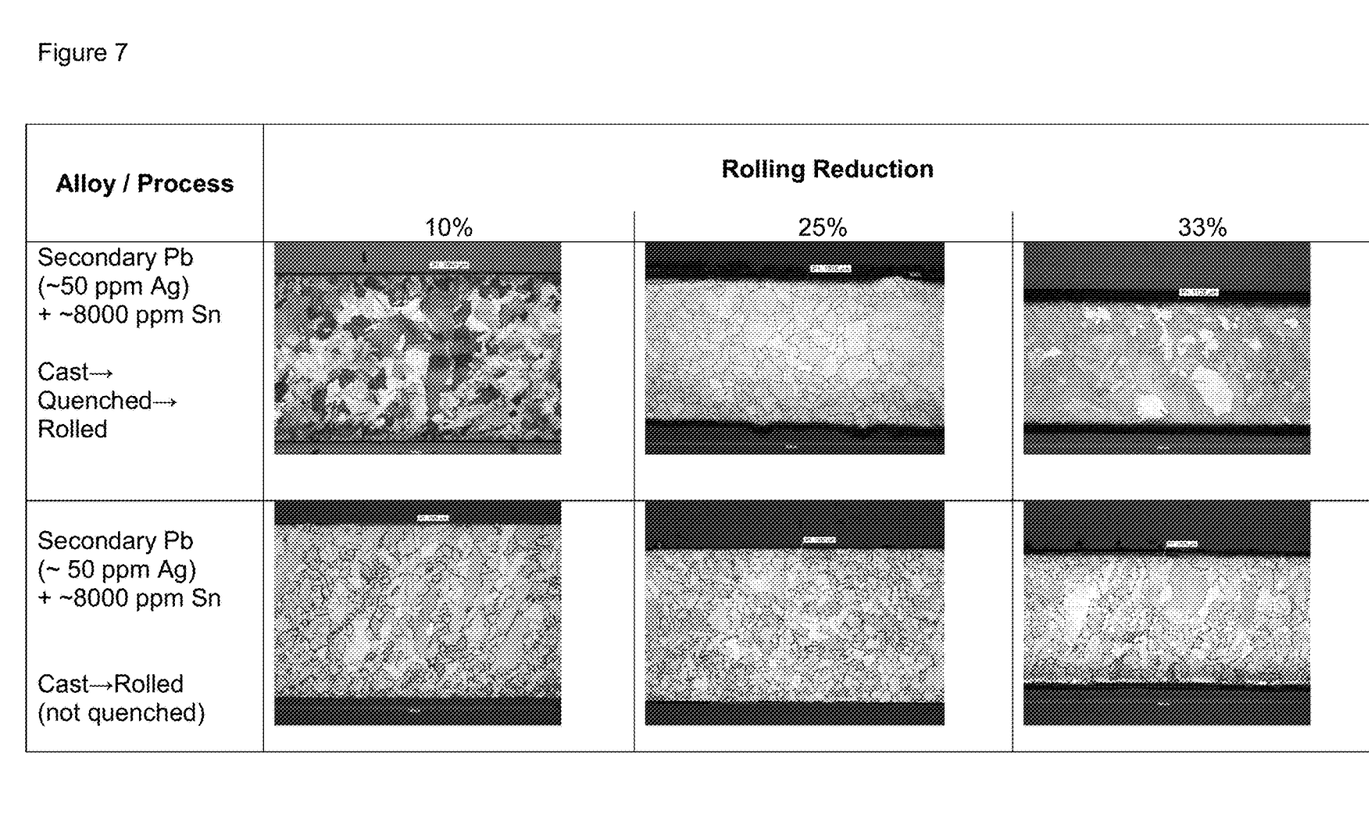
FIG. 7 contains photographic images of the crystallographic structures of the indicated compositions after being subjected to the indicated processes.

Pb—Ag—Sn alloy strips were made for this experiment using Secondary Pb, which contains about 50 ppm Ag (45 ppm measured; as set forth in Table 4) and about 8000 ppm of Sn (7600 ppm measured; as set forth in Table 8). Images of the strips showing the grain boundaries and the number of grain boundaries intersected by the indicated 1 mm line are set forth in FIG. 6. Additional images of strips showing the grain boundaries of as a function of quenching or not quenching after casting and rolling reduction are set forth in FIG. 7.

TABLE 8

| Element | Secondary Pb + ~0.8% Sn (wt %)* |
|---|---|
| Ag | 0.0045 |
| Al | 0.0001 |
| Bi | 0.0071 |
| Ca | 0.0000 |
| Cu | 0.0004 |
| Fe | 0.0003 |
| Mn | 0.0000 |
| Ni | 0.0001 |
| Sb | 0.0003 |
| Se | 0.0001 |
| Sn | 0.7600 |
| Te | 0.0001 |
| Zn | 0.0000 |

*by spark atomic emission spectroscopy

An accounting of the number of grain boundary intersections as a function of rolling temperature and amount of rolling reduction are set forth in Table 9.

TABLE 9

| Alloy | Rolling Temp | # of Grain Boundary Intersections* Rolling Reducton | | | | |
|---|---|---|---|---|---|---|
| Cast→Quenched→Rolled | (° C.) | 0% | 10% | 25% | 33% | 50% |
| Secondary Pb | 25 | 6 | 16 | 19 | 15 | 18 |
| (~50 ppm Ag) | 100 | 4 | 17 | 12 | 21 | 17 |
| (~70 ppm Bi) + | | | | | | |
| ~8000 ppm Sn | | | | | | |

*Number of grain boundaries intersected by a 1 mm perpendicular line across the thickness of the strip.

Pb—Ag—Bi Alloys Made with Secondary Pb

Pb—Ag—Bi alloy strips were made for this experiment using Secondary Pb, which contains about 50 ppm Ag (45 ppm measured; as set forth in Table 4) and about 70 ppm of Bi (71 ppm measured). An accounting of the number of grain boundary intersections as a function of alloy composition, rolling temperature, and amount of rolling reduction is set forth in Table 10.

TABLE 10

| Alloy | Rolling Temp | # of Grain Boundary Intersections* Rolling Reducton | | | | |
|---|---|---|---|---|---|---|
| Cast→Quenched→Rolled | (° C.) | 0% | 10% | 25% | 33% | 50% |
| Secondary Pb | 25 | 15 | 21 | 19 | 20 | 22 |
| (~50 ppm Ag) | 100 | 18 | 22 | 19 | 19 | 24 |
| (~70 ppm Bi) | | | | | | |
| Secondary Pb | 25 | 5 | 11 | 21 | 26 | 26 |
| (~50 ppm Ag) | 100 | 7 | 19 | 25 | 22 | 28 |
| (~70 ppm Bi) + | | | | | | |
| 50 ppm Ag for a total of | | | | | | |
| ~100 ppm Ag | | | | | | |

*Number of grain boundaries intersected by a 1 mm perpendicular line across the thickness of the strip.

Advantageously, battery grids produced from the lead-based alloys disclosed herein and especially the lead-tin-silver-bismuth-containing alloys are ready for pasting in as little as twelve hours, and certainly in 24 hours, compared to over seven days for certain conventional Pb—Ca and Pb—Ca—Sn alloys. Additionally, thin grids of the Pb—Sn—Ag—Bi alloys can be easily handled due to their relatively high initial hardness.

The alloys of the invention are workable in 24 hours, with the more preferred alloys workable in as little as two hours, especially if water-quenched. The alloys may be formed into battery grids by any conventional production method referred to in the prior art discussion, including book molding and continuous strip casting processes. The alloys of the present invention are particularly desirable for continuously cast strip processes. The invention also provides an improved method of manufacturing a grid and a grid having improved durability.

The discussion of references herein is intended merely to summarize the assertions made by their authors and no admission is made that any reference constitutes prior art. Applicants reserve the right to challenge the accuracy and pertinence of the cited references.

It is to be understood that the above-description is intended to be illustrative and not restrictive. Many embodiments will be apparent to those of skill in the art upon reading the above-description. The scope of the invention should therefore be determined not with reference to the above-description alone, but should be determined with reference to the claims and the full scope of equivalents to which such claims are entitled.

When introducing elements of the present invention or an embodiment thereof, the articles "a," "an," "the," and "said" are intended to mean that there are one or more of the elements. The terms "comprising," "including," and "having" are intended to be inclusive and mean that there may be additional elements other than the listed elements. Additionally, it is to be understood an embodiment that "consists essentially of" or "consists of" specified constituents may also contain reaction products of said constituents.

The recitation of numerical ranges by endpoints includes all numbers subsumed within that range. For example, a range described as being between 1 and 5 includes 1, 1.6, 2, 2.8, 3, 3.2, 4, 4.75, and 5.

What is claimed is:

1. A process of preparing a continuous cast lead-based alloy strip for use in the manufacture of a battery grid of a lead-acid battery, the process comprising mechanically deforming, at a deformation temperature in a range of about 15 to about 150° C., a continuous cast lead-based alloy strip having a thickness of $t_{cast}$ that is in a range that is from about 0.6 to about 2 mm to reduce the thickness of the strip to a thickness of $t_{reduced}$ that is in a range that is from about 0.4 to about 1.5 mm such that the reduction in thickness is in a range of about 10 to about 50%, wherein the lead-based alloy comprises lead and silver and is essentially free of calcium, and wherein the silver is at a concentration that is in a range of about 0.003 to about 0.015 weight percent, wherein the continuous cast and mechanically deformed lead-based alloy has a predominant equiaxed grain structure that comprises grain sizes that are in a range of about 0.1 to about 5 microns.

2. The process of claim 1 wherein the range of the deformation temperature is from about 15 to about 150° C., is the range of $t_{cast}$ is from about 0.6 to about 2 mm, the range of $t_{reduced}$ is from about 0.4 to about 1.5 mm, and the range of the reduction in thickness is from about 25 to about 40%.

3. The process of claim 2 wherein the mechanical deformation is accomplished by rolling or forging.

4. The process of claim 1 wherein the concentration of silver is in a range of about 0.004 to about 0.011 weight percent.

5. The process of claim 1 wherein the lead-based alloy consists essentially of lead and silver.

6. The process of claim 1 wherein the lead-based alloy further comprises bismuth at a concentration that is in a range of about 0.003 to about 0.02 weight percent.

7. The process of claim 6 wherein the bismuth concentration range is from about 0.005 to about 0.015 weight percent.

8. The process of claim 6 wherein the lead-based alloy consists essentially of lead, silver, and bismuth.

9. The process of claim 1 wherein the lead-based alloy further comprises tin at a concentration that is in a range of about 0.2 weight percent to about 1.8 weight percent.

10. The process of claim 9 wherein the tin concentration range is from about 0.4 to about 1.5 weight percent.

11. The process of claim 10 wherein the tin concentration range is from about 0.5 to about 1 weight percent.

12. The process of claim 9 wherein the lead-based alloy consists essentially of (a) lead, silver, and tin or (b) lead, silver, bismuth, and tin.

13. The process of claim 1 wherein the lead is at a concentration that is at least 98.000 weight percent.

14. The process of claim 1 wherein the mechanical deformation is accomplished by rolling or forging.

15. The process of claim 1 wherein at least about 75% by weight of the continuous cast and mechanically deformed lead-based alloy has an equiaxed grain structure.

16. The process of claim 1 wherein at least about 95% by weight of the continuous cast and mechanically deformed lead-based alloy has an equiaxed grain structure.

* * * * *